Aug. 10, 1971 G. H. ROBINSON 3,598,579

METHOD OF TRANSFERRING ELECTROSTATIC IMAGES TO A DIELECTRIC SHEET WHEREIN A REVERSAL OF POTENTIAL IS USED TO CLEAR BACKGROUND AREAS

Filed Sept. 6, 1967 3 Sheets-Sheet 1

GENE H. ROBINSON
INVENTOR.

BY Gary D. Fields
Robert W Hampton
ATTORNEYS

Aug. 10, 1971 G. H. ROBINSON 3,598,579

METHOD OF TRANSFERRING ELECTROSTATIC IMAGES TO A DIELECTRIC SHEET WHEREIN A REVERSAL OF POTENTIAL IS USED TO CLEAR BACKGROUND AREAS

Filed Sept. 6, 1967 3 Sheets-Sheet 2

GENE H. ROBINSON
INVENTOR.

BY Gary D. Fields
Robert W Hampton
ATTORNEYS

GENE H. ROBINSON
*INVENTOR.*
BY Gary D. Fields
Robert W Hampton
ATTORNEYS

United States Patent Office 3,598,579

Patented Aug. 10, 1971

3,598,579

METHOD OF TRANSFERRING ELECTROSTATIC IMAGES TO A DIELECTRIC SHEET WHEREIN A REVERSAL OF POTENTIAL IS USED TO CLEAR BACKGROUND AREAS

Gene H. Robinson, Rochester, N.Y., assignor to Eastman Kodak Company, Rochester, N.Y.

Filed Sept. 6, 1967, Ser. No. 665,911
Int. Cl. G03c *15/18, 13/18*
U.S. Cl. 96—1 7 Claims

ABSTRACT OF THE DISCLOSURE

The background density of a toned electrostatic image pattern produced on a receiver sheet is reduced by placing a receiver sheet comprising an insulating coating on a conductive layer, in face-to-face contact with a photoconductive element; exposing the element to a pattern of actinic radiation while an electrical potential is applied between the receiver and photo-conductive element; and momentarily reversing the polarity of the applied potential upon termination of the exposure. If the potential of the reversed polarity is properly selected, an electrostatic image will be produced having one polarity and a background having the opposite polarity. Also, either a positive or negative polarity can be used at the start of the procedure so that positive prints can be made from either a negative or positive original.

BACKGROUND OF THE INVENTION

This invention relates to processes wherein an electric charge is altered by the action of light during the simultaneous exposure to a pattern of actinic radiation and application of an electric field between the photoconductive element and a receiving material.

Although electrophotography has been a rapidly growing and expanding field, the results obtainable in response to certain copying needs have been less than satisfactory. For example, devices which can make positive prints from negative originals cannot ordinarily make positive prints from positive originals. Since most microfilm is negative, a printer which can make prints from this film cannot ordinarily be used to make positive prints from positive originals such as letters, invoices, memos, and the like. Likewise, most office copy machines for copying documents such as letters cannot be used for printout from negative microfilm.

The imagewise exposing of a photoconductive element while an electric field is applied between the element and receiver is taught by U.S. Pat. No. 2,825,814 to Walkup. In this patent, an electrostatic image on a receiver is developed. Walkup provides a variation of this concept in his U.S. Pat. No. 2,833,648 wherein, after exposure, the polarity of the electric field potential is reversed, causing an electrostatic image to be transferred from the receiver to the photoconductor which may then be developed.

SUMMARY OF THE INVENTION

In the present invention, a photoconductive element, including a photoconductive layer on a transparent conductive layer carried by a transparent support, is placed over a receiver and exposed to a pattern of actinic radiation simultaneously with application of a potential difference between the conductive layer and a plate so that an electrostatic image is placed on the receiver due to selective ionization across the air gap between the photoconductive layer and receiver, principally in the exposed areas. Charge due to ionization in the unexposed portions can be removed from the receiver by momentarily reversing the polarity of the potential after the termination of the exposure, resulting in a cleaner background. Since most of the preferred, stable, xerographic developers are all of one polarity, the production of positive prints from either positive or negative originals requires the use of reversal development techniques, i.e., development of an uncharged area. In the present invention, positive prints can be made from either a positive or negative original without the need for reversal development techniques. By properly controlling the magnitude of the reverse potential, an electrostatic image is produced on the receiver which is of one polarity while the background is of a generally equal and opposite polarity. Thus, this invention is an improvement over those disclosed in both of the above-mentioned Walkup patents in that the reversal of polarity always produces a developable charged image on the receiver, which image has one polarity while the background may have an opposite polarity.

Additional novel features of this invention will become apparent from the description which follows, taken in conjunction with the accompanying drawings.

DESCRIPTION OF THE PREFERRED EMBODIMENTS

In accordance with the method of this invention, a receiver sheet having a solid insulating coating or film on one side and a conductive backing on the other is placed with the insulating coating in contiguous face-to-face relationship with a photoconductive layer, also having a conductive backing. While the receiver and photoconductive layer are in this position, a potential is applied between the conductive layer of the photoconductive element and the conductive layer of the receiver, and the photoconductor is simultaneously exposed to a pattern of actinic radiation, such as a light image, from either a negative or positive original document to be copied. The portions of the photoconductive layer struck by the radiation will become more conductive whereas the darker portions will remain resistive. Although the receiver and photoconductive layer are in face-to-face relationship, an air gap exists between most parts of the two members due to the roughness of the surface of the receiver. Due to the ionization of the air in this gap, an electrostatic charge is placed on the portions of the receiver corresponding to the exposed portions of the photoconductive layer, thereby forming an electrostatic image on the receiver. Theoretically, no charge is placed on the receiver in those portions under the unexposed portion of the photoconductive layer, but, in fact, a small amount of ionization almost invariably takes place, resulting in deposition of some charge. This charge will tend to pick up toner particles during development, producing a darker background than is desirable. In order to reduce this background density when the exposure is completed, the polarity of the potential between the receiver and photoconductive layer is momentarily reversed, thereby dissipating some of the charge forming the electrostatic image on the receiver. However, since a relatively large charge is on the receiver in the portions corresponding to the formerly exposed portions of the photoconductive layer, not all of this electrostatic image will be dissipated. On the portions corresponding to the formerly unexposed portions of the photoconductive layer, the complete charge will be dissipated and, in fact, a charge of the pposite polarity will be placed thereon so that the receiver now carries an electrostatic image of one polarity and a background of the opposite polarity. Next, the receiver is separated from the photoconductive element and passed through a developing station containing toner particles of a polarity opposite to that of the electrostatic image but the same as the charge on the background. Thus, the toner particles in the developing solution will be attracted to the electrostatic image and repelled by the background. Conveniently, the receiver then is passed through a fixing station wherein the toner particles are permanently affixed to the receiver to form a permanent print.

Figure 1:
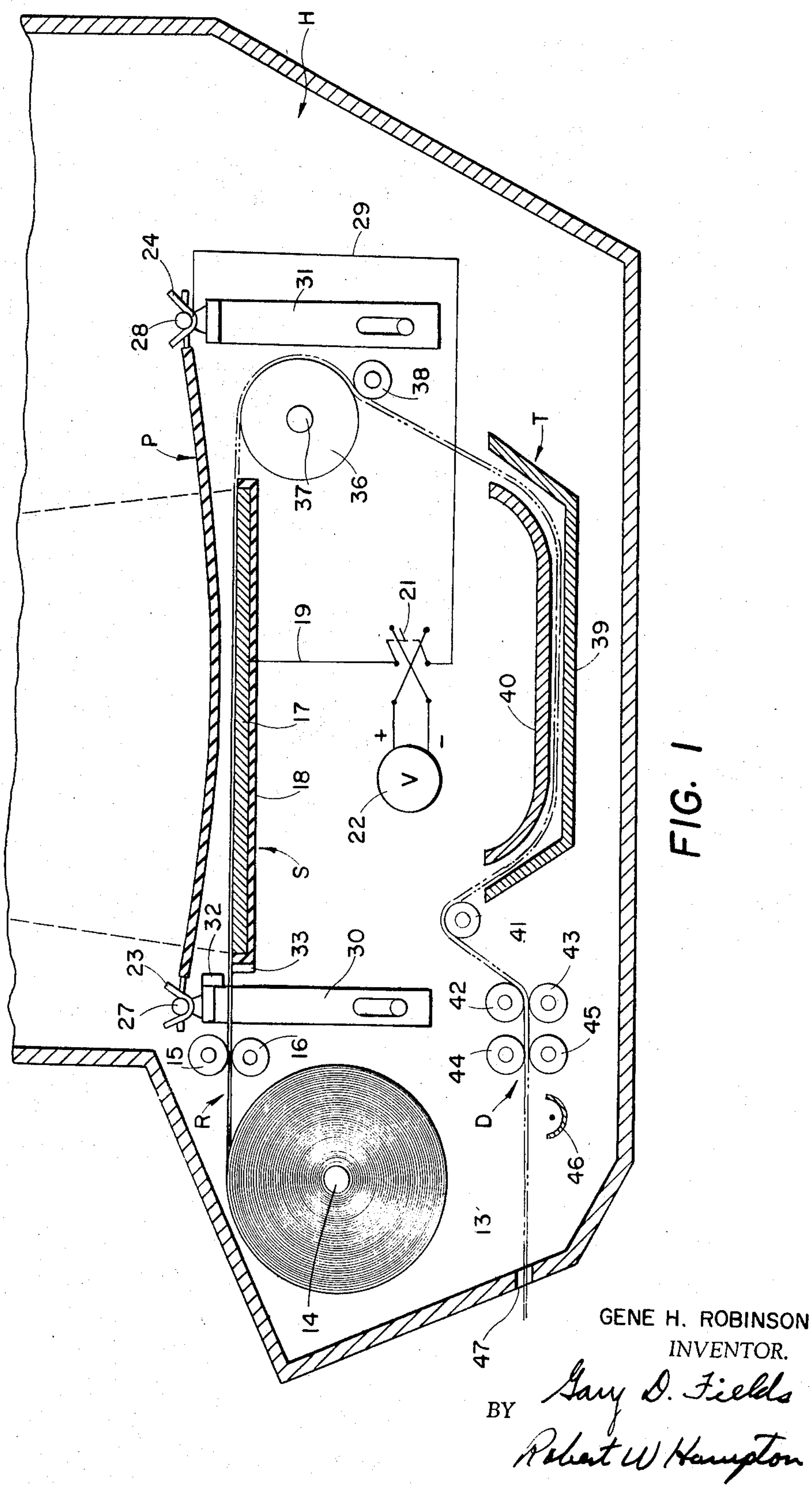
FIG. 1 is a schematic, fragmentary, side elevation of a printer in which the novel method of this invention may be utilized.
Figure 2:
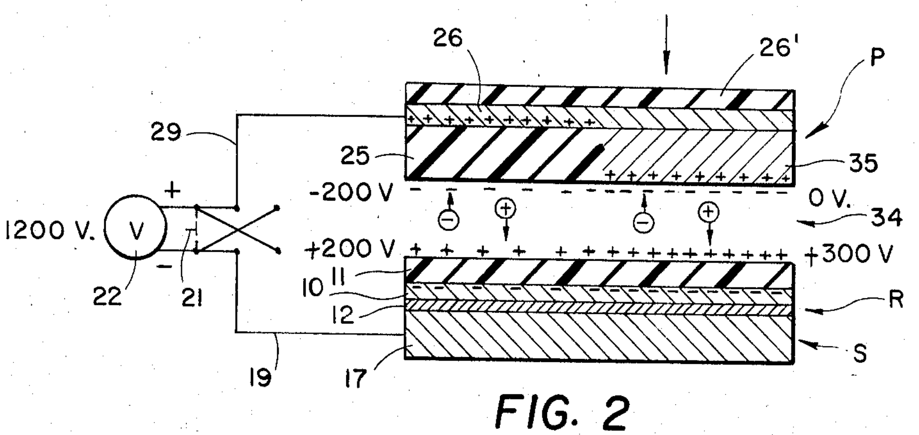
FIG. 2 is a greatly enlarged horizontal section through a photoconductive element and receiver segment showing the manner in which the charge is transferred during the application of a first electrical potential.
Figure 3:
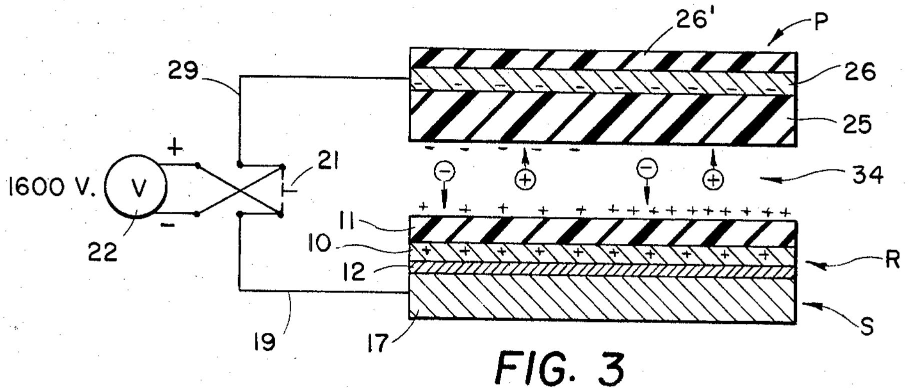
FIG. 3 is a greatly enlarged horizontal section of a photoconductive element and receiver, similar to FIG. 2 but showing the transfer of charges upon the reversal of potential between the photoconductive layer and receiver.
Figure 4:
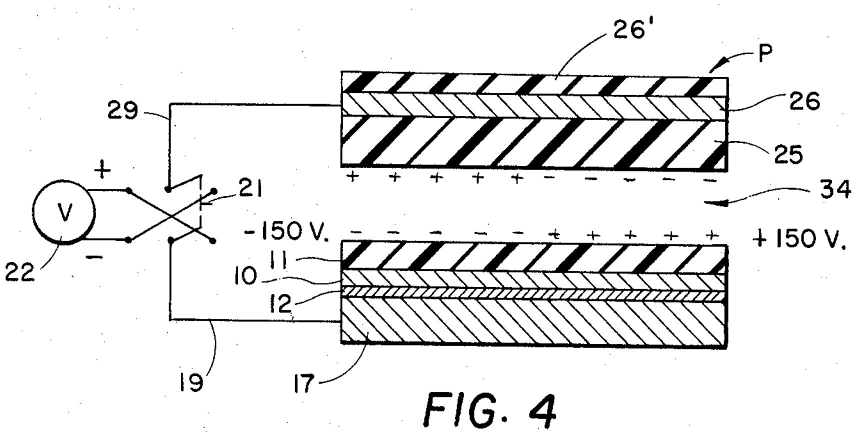
FIG. 4 is a greatly enlarged fragmentary horizontal section, similar to FIGS. 2 and 3, but showing the charges on the photoconductive layer and receiver at the end of the application of the second potential.

In accordance with this invention, an electrostatic printer, as shown in FIG. 1, may be provided for carrying out this novel method. The receiver R is made of paper 10, which has an insulating coating 11 on one side and which may have a conductive backing or layer 12 on the back side, as best seen in FIGS. 2–4. The receiver is fed from a supply roll 13 mounted for rotation about a horizontal axis 14 in printer housing H, then through a pair of horizontal feed rollers 15 and 16 and onto support or platen S, having a conductive plate or electrode 17 mounted in an insulating base 18. The platen is connected by a wire 19 through a reversing switch 21 to a DC voltage source 22.

A flexible photoconductive sheet P is supported at opposite ends above platen S by means of spaced brackets 23 and 24. As best seen in FIGS. 2–4, this photoconductive sheet or element P includes a photoconductive coating or layer 25 on a conductive layer 26 attached to a support 26'. Conveniently, the ends of photoconductive sheet P are attached to rods 27 and 28 which are received in the brackets 23 and 24, respectively. At least rod 28 is made of conductive material and is in electrical contact with metallic backing 26. When mounted on bracket 24, the electrical circuit is completed through wire 29 to reversing switch 21 which is adapted to selectively place voltage source 22 in the circuit with either a positive or negative potential applied to the conductive layer for a purpose described below. Bracket 23, which holds one end of the photoconductive element, is mounted on the upper end of front vertical arm 30, located at the front of platen S, whereas bracket 24 is attached to the upper end of rear vertical arm 31. These arms are each arranged for vertical movement, as shown, and front arm 30 carries a knife blade 32 which cooperates with a stationary cutter 33 at the front end of platen S to cut receiver R to a sheet of suitable length after it has been fed onto the platen. Vertical arms 30 and 31 are connected through a suitable linkage mechanism (not shown) to a motor (not shown) so that photoconductive element P may be lowered onto the receiver sheet S during exposure and raised during movement of the receiver sheet. When the photoconductive element P is superimposed on the severed receiver sheet supported by platen S, the photoconductive layer is ready to be imagewise exposed so that receiver R is charged in accordance with the image.

Looking at FIGS. 2–4, photoconductive element P, receiver R and platen S are greatly enlarged, as is the air gap 34 between the photoconductive layer and receiver, for clarity of illustration. Actually, the air gap is minuscule since the photoconductive layer rests directly on the receiver. The thickness of this air gap is determined by the roughness or "tooth" of the receiver paper. A range of 5 to 25 microns has been found to be satisfactory. The photoconductive coating 25 must be amphoelectric, i.e., able to retain either a negative or positive charge. A suitable formulation for such a photoconductive material is:

| | Grams |
|---|---|
| Copolyester binder of: terephthalic acid and a mixture of ethylene glycol (1 part by wt.) and 2,2-bis(4-beta-hydroxyethoxyphenyl) propane (9 parts by wt.) | 2 |
| Photoconductor of: 4',4''-bis(diethylamino)-2,6-dichloro-2',2''-dimethyltriphenylmethane | 0.5 |
| Sensitizer of: 4-(4-n-amyloxyphenyl)-2,6-bis(4-ethylphenyl)thiapyrylium perchlorate dissolved in 5 ml. of tetrahydrofuran | 0.025 |

This mixture is agtitated to produce a viscous solution which is coated on a suitable support such as subbed 2.5 mil polyethylene terephthalate which has been coated with a conductive layer. The coating weight may be such as to dry to a thickness of about 15 to 25 microns.

The receiver may be prepared according to the following formulation:

| | Grams |
|---|---|
| Terpolymer of: vinyl butyral (88% by wt.), vinyl acetate (2½% by wt.) and vinyl alcohol (9–13% by wt.), having an approximate molecular wt. of 50,000 (e.g. Butvar B–76, made by Shawinigan Resins (Division of Monsanto Chemical Co.)) | 60 |
| Toluene | 720 |
| Titanium dioxide | 20 |

This mixture is milled for 75 minutes at 15% solids and diluted to 10% solids prior to coating. It is coated on 16 lb. paper clay coated on both sides (e.g., St. Lawrence C2S, manufactured by Newton Falls Paper Company, Newton Falls, N.Y.). The mixture is coated at a dry wt. of 0.5 gm./ft.$^2$ to produce a dry thickness of 4 to 5 microns.

Either a negative or positive potential may first be applied to the receiver, the polarity of this potential depending on the polarity of the toner to be used and on whether the original is positive or negative. Thus, if a positive polarity developer is used, a positive-appearing print is obtained from a negative-appearing original by applying a first potential of such a polarity as to deposit negative charge on the receiver in the areas corresponding to the exposed areas of the photoconductive element. Using the same positive polarity developer, a positive-appearing print is obtained from a positive-appearing original by applying a first potential of such a polarity as to deposit positive charges on the receiver in the areas corresponding to the exposed areas of the photoconductive element. Similarly, if a negative polarity developer is used, positive-appearing prints are obtained from either negative or positive-appearing originals by applying a first potential of such a polarity as to deposit either positive or negative charges, respectively, on the receiver in the areas corresponding to the exposed areas of the photoconductive element. The important thing to note is that a charged area is always being developed whether the print is being made from a negative original or a positive original. Thus, no uncharged areas need be developed by reverse development techniques.

For purposes of illustration, it is assumed that the right-hand portion of the photoconductive element P is illuminated, whereas the left-hand portion thereof is not illuminated during exposure. When a potential is applied, as in FIG. 2, the exposed portion of the photoconductive layer, such as the right side, becomes conductive, whereas a portion which receives no exposure, such as the left-hand portion, remains insulating. As can be seen, a positive potential is applied to the surface of the now-conductive portion 35 of photoconductive layer 25 which attracts an equal number of negative charges from the ionized air gap between the photoconductive layer and receiver, resulting in a minute charge approaching zero at the surface of the photoconductive layer. On the other hand, a high positive charge is placed on the portion of insulating layer 12 of receiver R which is below the exposed portion 35 of the photoconductive layer. The magnitude of this charge depends on the applied potential from voltage source 22. A preferred potential of about 1200 volts has been found to be very satisfactory but potentials in the range of 1000 to 2000 volts may be used. Assuming an applied potential of 1200 volts, the potential on the right-hand portion of receiver R would be about +300 volts. On the left-hand side, however, less ionization takes place, resulting in a negative potential of about −200 volts on the surface of the photoconductive layer 25. At the same time, a positive potential of +200 volts is placed on insulating layer 11 of receiver R.

Next, the exposure of the photoconductive layer is discontinued so that it becomes more insulating as shown in FIG. 3. Then the potential from source 22 is reversed by means of switch 21. Again, a range of 1000 to 2000 volts has been found satisfactory, but a potential of about 1600 volts is preferred. It will be noted that just before the reversal of potential a difference in potential between the portions of the receiver corresponding to the exposed and unexposed portions of the photoconductive layer is 100 volts, i.e., the difference between 300 volts and 200 volts. With the potential reversed, ionization in the air gap takes place, resulting in a flow of negative ions to the surface of the receiver and a flow of positive ions to the surface of the photoconductive layer. The period of time during which the reverse polarity is applied is about one second or less. Ideally, the magnitude and duration of application of the potential should be selected to produce equal and opposite polarities on the portions of the receiver below the exposed and unexposed portions of the photoconductive layer. In the illustration given, potentials of +150 volts and −150 volts, respectively, as shown in FIG. 4, will result. It will be noted that this potential differential is now 300 volts as compared to 100 volts after the exposure, i.e., the difference between −150 volts and +150 volts as compared to the difference between +200 volts and +300 volts. Thus, the background density will be reduced when the receiver sheet is developed since little, if any, toner will adhere to the background areas which have the same polarity as that of the toner. The receiver sheet R, which now carries an electrostatic image thereon, is fed around roller 36, journaled in housing H on a central shaft 37, and past roller 38 into a toner station T having a receptacle 39 through which the receiver is fed by means of guide 40. Although a liquid toner station has been shown, it will be understood that powder could be used as well. The toner contains particles charged with a polarity opposite that of the image area of the receiver so that they stick to this area but are repelled from the like-charged background areas. As the receiver leaves the toner station T, it may pass over a roller 41 and through a drying station D having a plurality of closely spaced compression rollers, such as rollers 42 and 43 and rollers 44 and 45. Finally, the receiver may pass an infrared lamp 46, which completes the drying, and then out of the housing H through a slot 47, after which it is ready for use.

Figure 5:
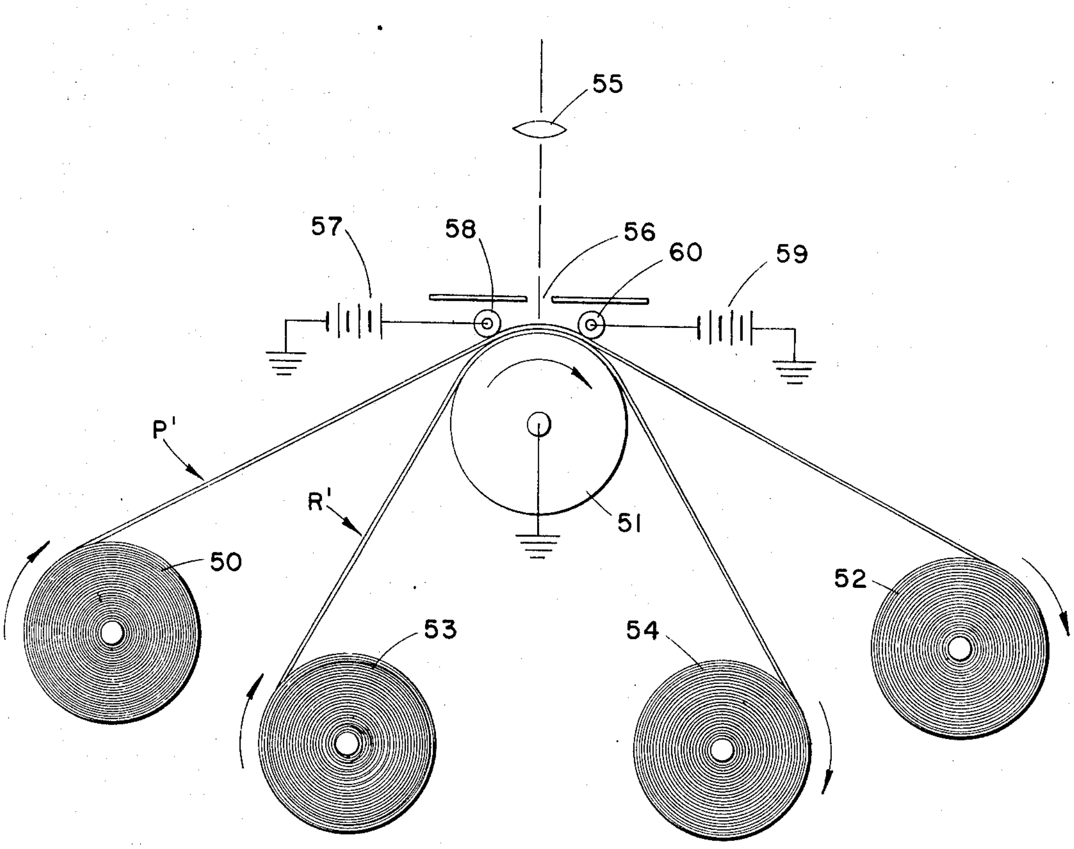
FIG. 5 is a schematic illustration of one apparatus incorporating the features of this invention.

An alternative apparatus is shown in FIG. 5 wherein applicant's novel method may be practiced on a continuous basis. In this embodiment, photoconductive element P is continuously fed from a supply roll 50 over a cylindrical, rotatable, grounded platen 51 to a take-up roll 52. Receiving sheet R′ is simultaneously fed from a supply roll 53 over platen 51 to a take-up roll 54. A light image is projected, by means of a projection system 55, through a slit 56 and onto continuously moving photoconductive element P′. An electric potential is applied between a transparent conductive layer of the photoconductive element and platen 51 by potential source 57 connected to the metallic backing, as by roller 58 which bears against platen 51 with photoconductive layer P′ and receiving sheet R′ therebetween. Advantageously, a second potential source 59 is connected to a roller 60 which is also in contact with the conductive backing on photoconductor P′. Roller 60 is spaced from roller 58 and is on the opposite side of slit 56, photoconductive element P′ and receiving sheet R′ running between it and platen 51.

Thus, as the photoconductive element and reciver move from roller 58 past slit 56 to roller 60, they are first subjected to an electrical potential of one polarity by potential source 57. The slit and projection system may be arranged so that exposure occurs substantially simultaneously with the application of the electrical potential or shortly thereafter. However, a voltage gradient will exist between rollers 58 and 60 so that, as the moving photoconductive element and receiving sheet apprach roller 60, the electrical potential is reversed causing any charge on the background areas to be removed and a charge of opposite polarity to be placed thereon.

From the foregoing, it can be seen that the novel features of this invention have been fulfilled to a marked degree. With the photoconductive element P placed over the receiver on the platen, the photoconductive layer can be simultaneously exposed and charged using a source of relatively low voltage and current. After completion of the exposure, the voltage polarity is reversed for a short period of time, such as one second or less, resulting not only in the dissipation of any existing charge on the background area but also the application to that area of a charge having a polarity opposite that on the image areas. This process is obviously quite rapid and produces positive prints from either a negative or a positive original, depending on the polarity of the potential first applied between the photoconductive element and receiver. This can be done using only one toner for both types of prints. Furthermore, a charged area is always developed whether a positive or a negative original is used.

The invention has been described in detail with particular reference to preferred embodiments thereof, but it will be understood that variations and modifications can be effected within the spirit and scope of the invention.

I claim:

1. A method of forming an electrostatic image on a receiver having an insulating layer and a conductive layer, said method comprising in order:

placing an uncharged photoconductive element, having a photoconductive insulating layer and a conductive backing, against said receiver with said photoconductive layer in virtual contact with said receiver but having a miniscule air gap therebetween;

selectively placing an electrostatic charge on said insulating layer of said receiver by applying a first electrical potential between said conductive layer and said conductive backing sufficient to ionize air within said air gap and simultaneously exposing said photoconductive element to a pattern of actinic radiation to cause a charge transfer to said receiver, said transfer being of greater magnitude in said exposed portions than in said unexposed portions to form an electrostatic pattern on said receiver;

discontinuing exposure of said photoconductive layer to said light image pattern; and removing charge on said receiver in the unexposed portions by momentarily applying a second potential of opposite polarity to said receiver of sufficient magnitude to ionize air within said air gap.

2. A method of forming an electrostatic image on a receiver, as set forth in claim 1, wherein:

the polarity of said first potential is applied to provide development of either the image or background areas of said receiver with a single toner so that positive prints can be made from either a negative or positive radiation pattern.

3. A method of forming an electrostatic image on a receiver, as set forth in claim 1, wherein:
said magnitude of said second potential is sufficient to charge said unexposed portions of said receiver to a polarity opposite that of said electrostatic pattern but insufficient to discharge said electrostatic pattern.

4. A method of forming an electrostatic image on a receiver as set forth in claim 1, wherein:
said first and second potentials are between 1000 and 2000 volts.

5. A method of forming an electrostatic image on a receiver, as set forth in claim 1, wherein:
said first potential is about 1200 volts; and
said second potential is about 1600 volts.

6. In a method of forming an electrostatic latent image on an insulating film which overlies a conductive electrode wherein the method includes:
positioning an uncharged photoconducitve insulating layer having a conductive backing in closely spaced relationship with said insulating film so that said photoconductive insulating layer and said insulating film are in virtual contact:
applying to said electrode a first potential with respect to said conductive backing while simultaneously exposing said photoconductive insulating layer to an actinic radiation pattern to selectively increase its conductivity to form an electrostatic image pattern on said insulating film corresponding to said actinic radiation pattern;
cutting off said actinic radiation pattern from said photoconductive insulating layer;
subsequently applying to said electrode a second potential with respect to said conductive backing of a polarity opposite to the polarity of said first potential;
the improvement comprising:

causing said first potential to be of sufficient magnitude to ionize the air in the space between said insulating film and said photoconductive insulating layer in those areas exposed to radiation; and
causing said second potential to be of sufficient magnitude to ionize the air in the space between said photoconductive layer and said insulating layer to cause charge on the previously unexposed areas of said insulating film to be dissipated.

7. A method of forming an electrostatic image, as set forth in claim 6, wherein:
said magintude of said second potential is sufficient to place a charge on said previously unexposed areas which is opposite in polarity to the charge of said electrostatic image.

References Cited

UNITED STATES PATENTS

| | | | |
|---|---|---|---|
| 2,937,943 | 5/1960 | Walkup | 96—1 |
| 3,057,719 | 10/1962 | Byrne et al. | 96—1 |
| 3,084,061 | 4/1963 | Hall | 96—1X |
| 3,147,679 | 9/1964 | Schaffert | 96—1X |
| 2,833,648 | 5/1958 | Walkup | 96—1 |
| 3,444,369 | 5/1969 | Malineric | 250—65.2 |
| 2,817,765 | 12/1957 | Hayford et al. | 96—1X |

FOREIGN PATENTS

| | | | |
|---|---|---|---|
| 873,080 | 7/1961 | Great Britain | 96—1 |

GEORGE F. LESMES, Primary Examiner

R. E. MARTIN, Assistant Examiner

U.S. Cl. X.R.

355—3, 16